(12) United States Patent
Barger

(10) Patent No.: US 7,547,065 B2
(45) Date of Patent: Jun. 16, 2009

(54) CHILD VEHICLE SEAT WITH HARNESS ADJUSTMENT MECHANISM

(75) Inventor: Jeffery A. Barger, Greenville, OH (US)

(73) Assignee: Evenflo Company, Inc., Miamisburg, OH (US)

( * ) Notice: Subject to any disclaimer, the term of this patent is extended or adjusted under 35 U.S.C. 154(b) by 99 days.

(21) Appl. No.: 11/710,259

(22) Filed: Feb. 23, 2007

(65) Prior Publication Data

US 2008/0201923 A1     Aug. 28, 2008

(51) Int. Cl.
*A47C 1/08* (2006.01)
*B60R 22/00* (2006.01)

(52) U.S. Cl. .............. 297/250.1; 297/473; 297/483
(58) Field of Classification Search .............. 297/250.1, 297/256.15, 483, 473
See application file for complete search history.

(56) References Cited

U.S. PATENT DOCUMENTS

| | | |
|---|---|---|
| 2,143,634 A | 1/1939 | Saunders |
| 3,198,575 A | 8/1965 | Hawkins |
| 3,572,827 A | 3/1971 | Merelis |
| 3,791,694 A | 2/1974 | Roberts et al. |
| 3,948,556 A | 4/1976 | Hyde et al. |
| 4,040,664 A | 8/1977 | Tanaka et al. |
| 4,047,755 A | 9/1977 | McDonald et al. |
| 4,058,342 A | 11/1977 | Ettridge |
| 4,168,050 A | 9/1979 | Nerem et al. |
| 4,205,877 A | 6/1980 | Ettridge |
| 4,342,483 A | 8/1982 | Takada |
| 4,376,551 A | 3/1983 | Cone |
| 4,402,548 A | 9/1983 | Mason |
| 4,545,617 A | 10/1985 | Drexler et al. |
| 4,607,863 A | 8/1986 | Yokote |
| 4,632,456 A | 12/1986 | Kassai |
| 4,709,960 A | 12/1987 | Launes |
| 4,759,569 A | 7/1988 | Potter |
| 4,790,601 A | 12/1988 | Burleigh et al. |
| 4,854,639 A | 8/1989 | Burleigh et al. |
| 4,858,997 A | 8/1989 | Shubin |
| 4,880,254 A | 11/1989 | Muller |
| 4,915,446 A | 4/1990 | Darling et al. |
| 4,936,629 A | 6/1990 | Young |
| 4,971,392 A | 11/1990 | Young |
| 5,082,325 A | 1/1992 | Sedlack |
| 5,115,523 A | 5/1992 | Cone |
| 5,125,686 A | 6/1992 | Yano et al. |
| 5,181,761 A | 1/1993 | Meeker |

(Continued)

FOREIGN PATENT DOCUMENTS

GB     2 143 727 A     2/1985

(Continued)

*Primary Examiner*—Sarah B McPartlin
(74) *Attorney, Agent, or Firm*—Taft Stettinius & Hollister LLP

(57) ABSTRACT

A child restraint seat is provided including a seat shell adapted to be coupled to a vehicle seat, a child restraint harness coupled to the seat shell, and a harness adjustment mechanism. A shoulder strap mounting mechanism permits the height of the shoulder strap mounts to be varied to adapt the seat to accommodate children of different sizes. The mounting mechanism is easily operable from the front of the seat without requiring operation of latching mechanism or the rethreading of straps.

12 Claims, 8 Drawing Sheets

U.S. PATENT DOCUMENTS

| | | | |
|---|---|---|---|
| 5,335,964 A | 8/1994 | Sedlack et al. |
| 5,344,213 A | 9/1994 | Koyanagi |
| 5,443,037 A | 8/1995 | Saleme |
| 5,449,223 A | 9/1995 | Miculici et al. |
| 5,468,046 A | 11/1995 | Weber et al. |
| 5,496,092 A | 3/1996 | Williams et al. |
| 5,527,094 A | 6/1996 | Hiramatsu et al. |
| 5,580,126 A | 12/1996 | Sedlack |
| 5,609,367 A | 3/1997 | Eusebi et al. |
| 5,609,393 A | 3/1997 | Meeker et al. |
| 5,615,917 A | 4/1997 | Bauer |
| 5,653,504 A | 8/1997 | Henson |
| 5,678,887 A | 10/1997 | Sher |
| 5,683,138 A | 11/1997 | Ward, Jr. et al. |
| 5,713,109 A | 2/1998 | Cech |
| 5,722,731 A | 3/1998 | Chang |
| 5,775,772 A | 7/1998 | Lefranc |
| 5,779,319 A | 7/1998 | Merrick |
| 5,794,977 A | 8/1998 | Frank |
| 5,845,967 A | 12/1998 | Kane et al. |
| 5,931,502 A | 8/1999 | Frank et al. |
| 5,988,759 A | 11/1999 | Bauer et al. |
| 6,030,047 A * | 2/2000 | Kain ......................... 297/484 |
| 6,155,638 A | 12/2000 | Bapst |
| 6,189,970 B1 | 2/2001 | Rosko |
| 6,398,302 B1 * | 6/2002 | Freedman et al. ......... 297/250.1 |
| 6,491,348 B1 | 12/2002 | Kain |
| 6,623,074 B2 * | 9/2003 | Asbach et al. ........... 297/250.1 |
| 6,779,843 B2 | 8/2004 | Kain |
| 6,820,939 B1 * | 11/2004 | Chen ......................... 297/484 |
| 7,059,676 B2 * | 6/2006 | McNeff ................... 297/250.1 |
| 7,387,336 B2 * | 6/2008 | Sakumoto ................ 297/250.1 |
| 2002/0195867 A1 | 12/2002 | Barger et al. |
| 2003/0047972 A1 * | 3/2003 | Burleigh et al. ........ 297/216.11 |

FOREIGN PATENT DOCUMENTS

GB           2 282 321 A      5/1995

* cited by examiner

CHILD VEHICLE SEAT WITH HARNESS ADJUSTMENT MECHANISM

BACKGROUND OF THE INVENTION

1. Field of the Invention

The present invention relates generally to seats for use by children in motor vehicles and, particularly, to seats having child-restraining harnesses. More particularly, the present invention relates to children's vehicle seats with harness adjustment mechanisms.

2. Description of the Related Art

Child seats are widely used by operators of motor vehicles. Child seats generally include a plastic shell with a cushioned seat formed over the shell. A harness is generally provided on the seat to restrain the child and retain the child in the seat. Harness systems typically include a shoulder harness with straps designed to extend over the shoulders of the child, a lower belt, and a buckle. The belts and straps included with the harness system can typically be adjusted in length to accommodate children of different sizes.

Additionally, some child seats allow adjustment of the height of the shoulder harness retainers to permit the seat to accommodate children of various heights and to allow the seat to be adjusted as a child grows. In some prior art child seats, adjustment of the height of the shoulder harness retainers requires rethreading the shoulder straps. See, e.g., U.S. Pat. Nos. 6,543,847 and 6,189,970. In other prior art seats, operation of a mechanical locking or latching mechanism is necessary to adjust the height of the shoulder straps. See, e.g., U.S. Pat. Nos. 6,626,493 and 6,779,843. Many conventional seats also require access to the rear portion of the child seat for adjustments. See, e.g., U.S. Pat. Nos. 6,626,493 and 6,491,348.

In sum, the prior art devices do not provide the important advantages of allowing easy adjustment of the position of the shoulder strap harness retainers without the need to rethread the straps, access the rear side of the seat, or operate a locking or latching mechanism.

SUMMARY OF THE INVENTION

It is an aspect of the present invention to provide a child restraint seat that includes: (a) a seat shell having a bottom seat portion and a back support portion, the back support portion having a front surface, a rear surface, and one or more slots, each slot extending through the back support portion from the front surface to the rear surface, (b) a harness connected to the seat shell including one or more shoulder straps; and (c) a shoulder strap mounting mechanism. The shoulder strap mounting mechanism may include (a) one or more harness mounts, each harness mount connecting to one shoulder strap adjacent to the front surface of the back support portion of the seat shell and extending through one slot, and (b) a height adjustment mechanism connected to the rear surface of the back support portion of the seat shell, the height adjustment mechanism including a trolley connected to the harness mounts and a support apparatus.

More specifically, the support apparatus may include a cord, the cord being affixed to the back support portion and the trolley being slidingly connected to the cord. The cord is fixed to the back support portion above the highest point of travel of the trolley. Preferably in this embodiment, the cord may extend longitudinally to one end of the trolley, laterally adjacent to or within the trolley, and longitudinally to and is connected to the back support portion at a point below the lowest point of travel of the trolley.

In an embodiment, the cord may pass through a portion of the trolley, or, alternately, the cord may be connected to the trolley bar externally.

In an embodiment, the support apparatus additionally may include a second cord, the second cord being fixed to the back support portion in the same way, but at an opposite side of the back support portion, as the first.

In a further embodiment, the cord passes through a portion of the trolley. In another further embodiment, the cord is connected to the trolley externally.

It is also an aspect of the present invention to provide child restraint seat including: (a) a seat shell having a bottom seat portion and a back support portion, the back support portion having a front surface, a rear surface, and one or more slots, each slot extending through the back support portion from the front surface to the rear surface, and having an upper end away from the bottom seat portion and a lower end nearest the bottom seat portion; (b) a harness connected to the seat shell including one or more shoulder straps; and (c) a shoulder strap mounting mechanism. The shoulder strap mounting mechanism includes one or more shoulder strap mounts, each shoulder strap mount having a first end connecting to one shoulder strap adjacent to the front surface of the back support portion of the seat shell and a second end extending through one slot, a detent assembly positioned on the rear surface of the back support portion of the seat shell including detents, and a strap mount retainer for holding the strap mount in the detents. The detent assembly preferably comprise depressions and the retainer preferably comprises a cord.

In one embodiment, the detent assembly comprises a plurality of depressions on the rear surface of the back support portion adjacent to the one or more slots, each depression being adapted to couple with engagement portions on one or more of the shoulder strap mounts.

In another embodiment, the detent assembly comprises a plurality of protuberances on the rear surface of the back support portion adjacent to one or more slots, each protuberance being adapted to couple with the engagement portion on one or more of the shoulder strap mounts.

In one embodiment, the cord is an elastic cord. In another embodiment, the cord is substantially inelastic.

In another embodiment, the shoulder strap mount is slidingly connected to the cord.

In another embodiment, the detent assembly comprises a plurality of depressions on the rear surface of the back support portion adjacent to the slots, each depression is adapted to couple with an engagement portion of the shoulder strap mount; the cord is an elastic cord; and the shoulder strap mount is slidingly connected to the cord.

These and other aspects and objects, along with advantages and features of the invention disclosed herein, will be made more apparent from the description, drawings, and claims that follow.

BRIEF DESCRIPTION OF THE DRAWINGS

The foregoing and other aspects, objects, features, and advantages of the present invention, as well as the invention itself, will be more fully understood from the following description of preferred embodiments, when read together with the accompanying drawings, in which.

DETAILED DESCRIPTION

Figure 1:
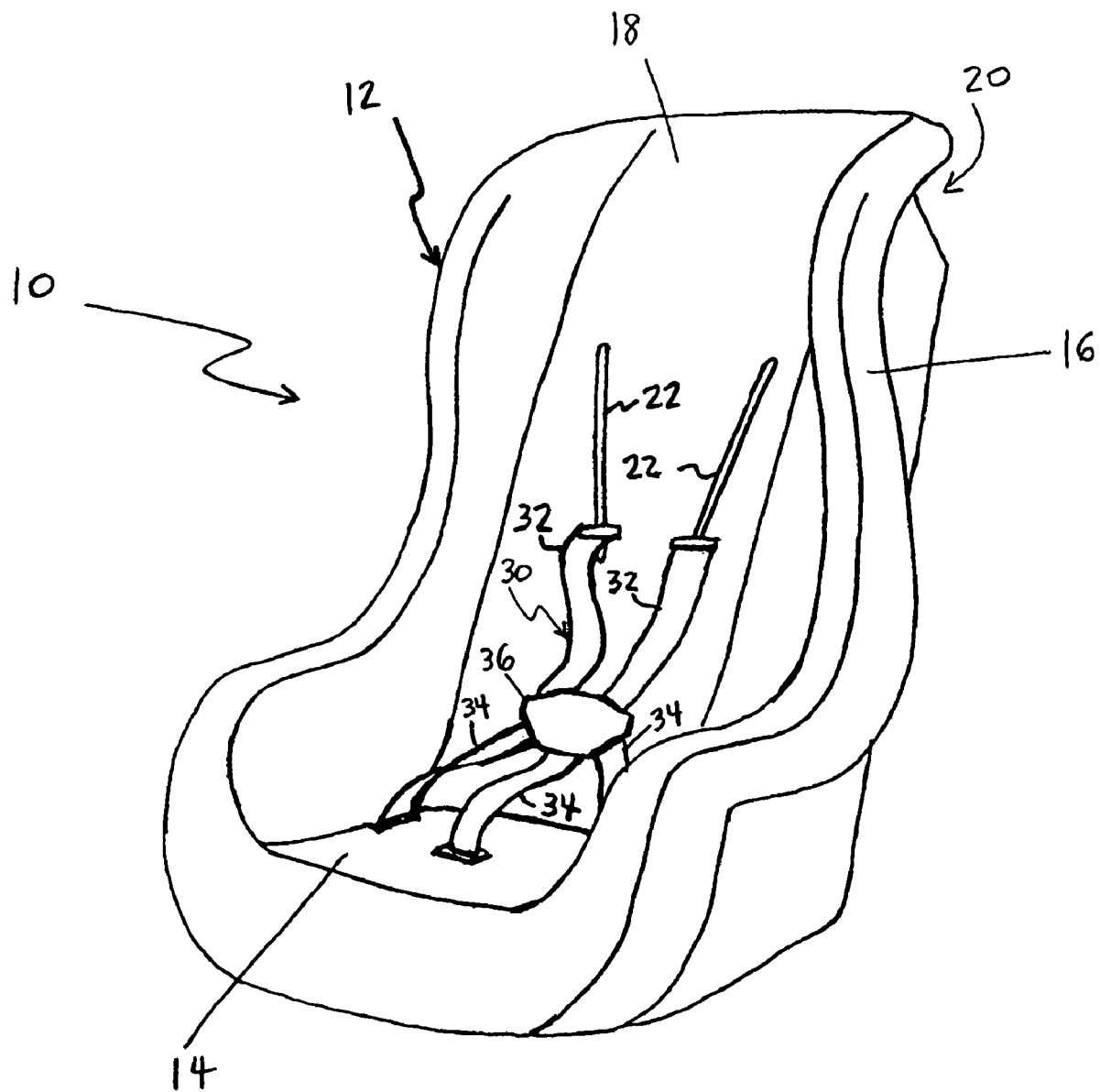
FIG. 1 is a perspective view of a child restraint vehicle seat in accordance with the present invention.

Referring to FIG. 1, an embodiment of a child restraint seat 10 includes a seat shell 12 with a bottom seat portion 14 adapted to support a child's bottom and upper legs and a back support portion 16 positioned to lie at an angle to bottom seat portion 14. The back support portion has a front surface 18, a rear surface 20, and two slots 22. Harness 30 is provided to restrain a child's movement relative to the seat shell 10 and may include two shoulder straps 32, a lower belt assembly 34, and a buckle unit 36.

Although seat shell 12 may be a one-piece molded body, it is within the scope of the present invention to use a multiple-piece body. In preferred embodiments, seat shell 12 may include one or more cushions or padding layers (not shown) that cover bottom seat portion 14 and back support portion 16 to enhance the comfort of the child (not shown) sitting in the seat 10.

Figure 2:
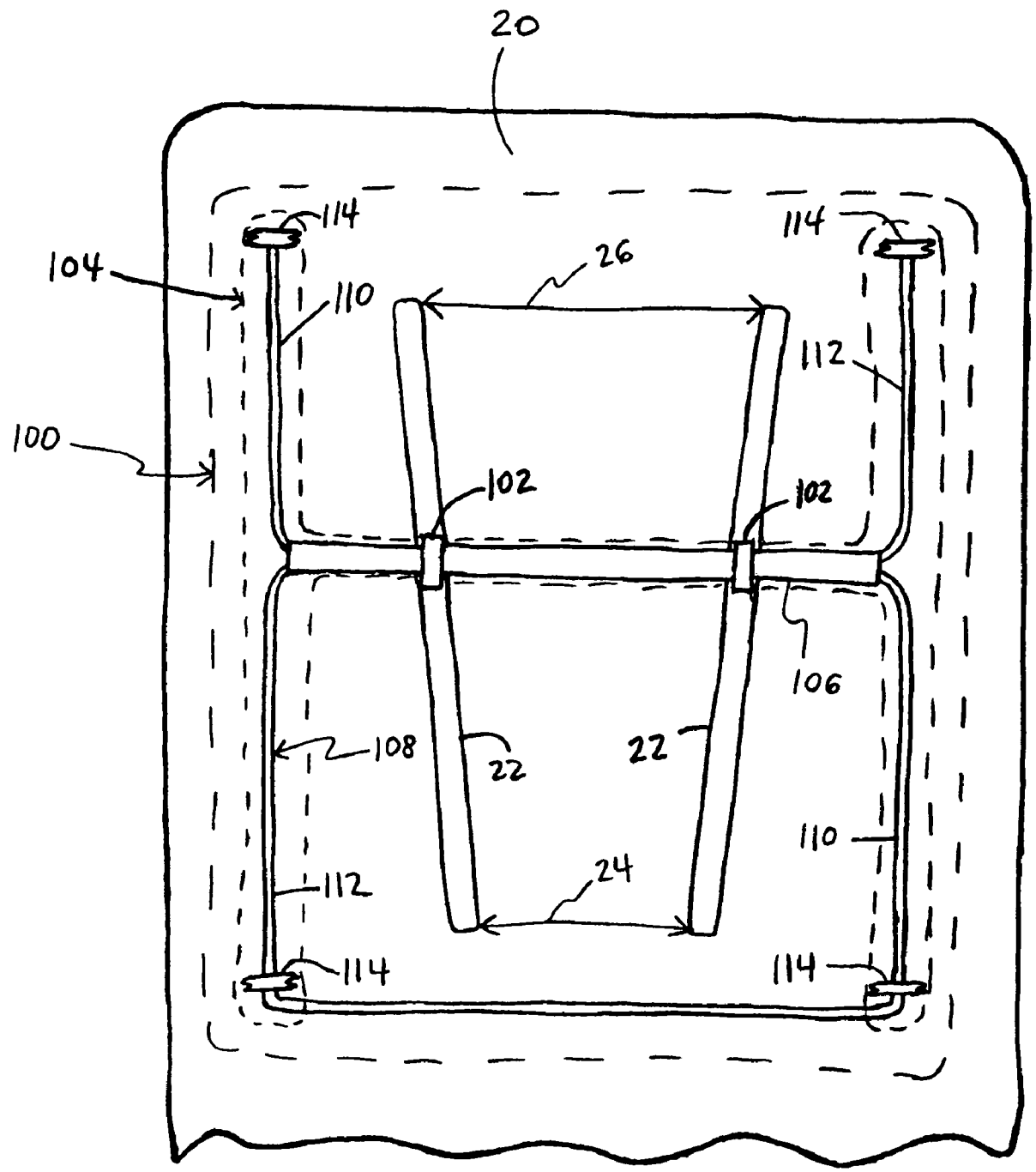
FIG. 2 is a rear elevation view of an embodiment of a trolley mechanism for use in connection with the restraint of FIG. 1.

Turning now to FIG. 2, slots 22 may be aligned in spaced-apart diverging relation (lowest end to highest end). Preferably, a first distance 24 separates the lowest end of slots 22 and a longer second distance 26 separates the highest end of slots 22. The slots 22 may be arranged in a V-shaped pattern to provide for variable lateral spacing of the shoulder straps 32 as described below.

In an embodiment of the present invention, as shown in FIG. 2, shoulder strap mounting mechanism 100 includes strap mounts 102 to which the shoulder straps 32 are coupled and a height adjustment mechanism 104 which supports the strap mounts 102 and allows their positions within the slots 22 to be adjusted. The height of the strap mounts 102 determines the nominal height of the shoulder straps 32 above bottom seat portion 14. In general, a taller child requires the strap mounts 102 to be higher than required for a shorter child.

The height adjustment mechanism 104 includes a trolley 106 and a cord assembly 108. Each strap mount 102 extends through the slots 22 in the back support portion 16 of the seat shell 12 and is slidably connected to the trolley 106. The connection between the strap mounts 102 and the trolley 106 is such that the strap mounts 102 can slide laterally along the trolley within the range of motion allowed by the slots 22. This slidable connection between the strap mounts 102 and the trolley 106 allows the distance between the slots 22 to be narrower near the bottom seat portion 14 of the seat shell 12. As the trolley 106 is moved away from the bottom seat portion 14 to accommodate a taller child, the lateral distance between the strap mounts 102 increases, thereby accommodating the taller child's wider shoulders.

The trolley 106 is supported by a cord assembly 108 which maintains the trolley 106 in a substantially horizontal position adjacent, but not affixed, to the rear surface 20 of the back support portion 16 of the seat shell 12. The cord assembly 108 includes a first cord 110 and a second cord 112. Cords 110/112 are attached to rear surface 20 of the seat shell 12 in a generally H-shaped fashion. Cord 110 forms the upper left, horizontal, and lower right segments and cord 112 forms the upper right, horizontal, and lower left segments. Cords 110/112 are affixed to the rear surface of the back support portion 16 at the four endpoints 114 of the vertical segments of the H-shape arrangement. Trolley 106 is slidably connected to the horizontal segments of cords 110/112. Because the total length of each cord 110/112 remains constant, trolley 106 is maintained in a substantially horizontal orientation as it is moved throughout its range of motion permitted by the slots 22. Thus, strap mounts 102 are held at substantially equivalent heights above the bottom seat portion 14 as they are moved throughout the range of motion.

Figure 3A:
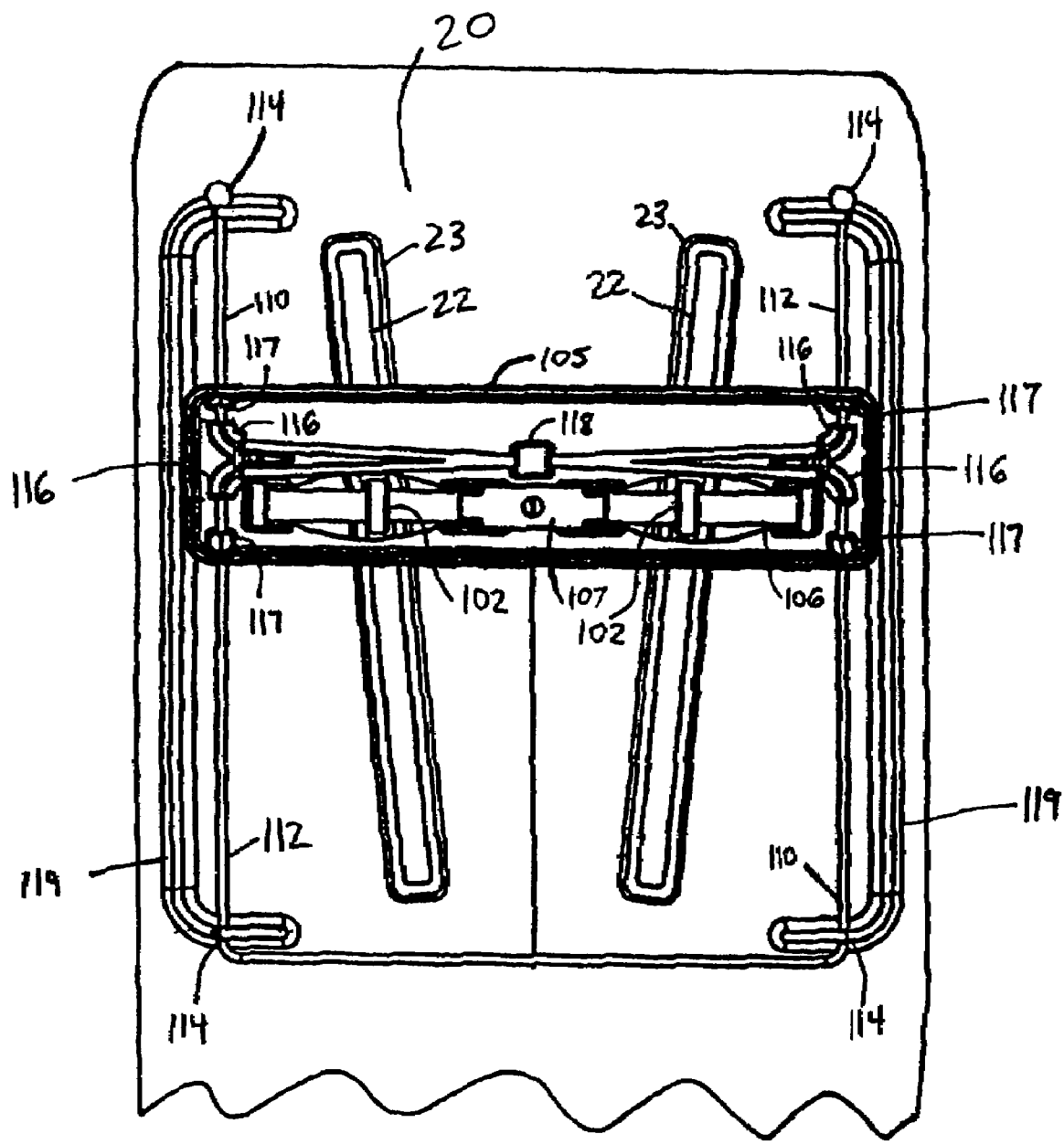
FIG. 3A is a rear elevation view of an alternate embodiment of a trolley mechanism for use in connection with the child restraint of FIG. 1.
Figure 3B:
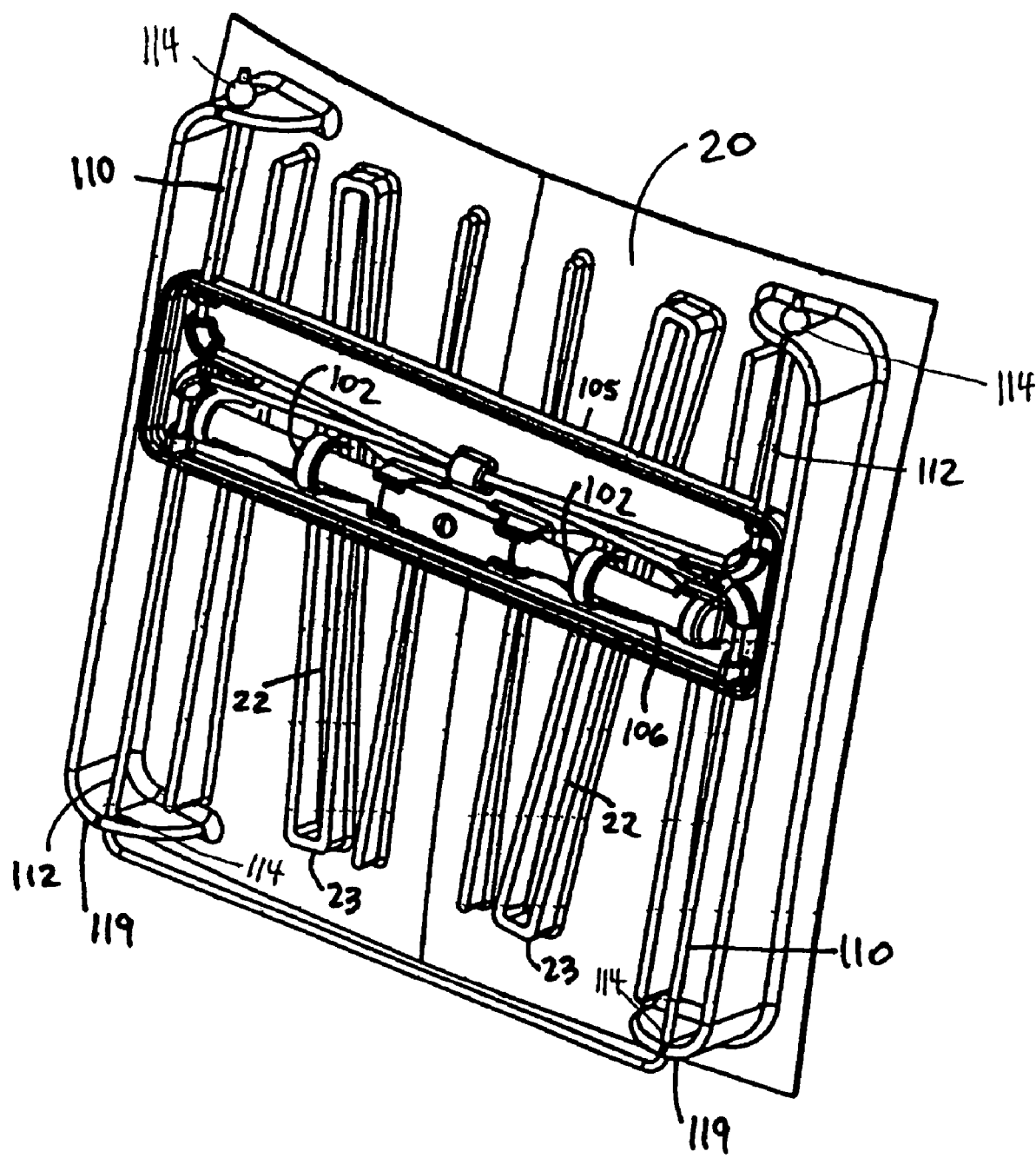
FIG. 3B is a rear perspective view of the trolley mechanism of FIG. 3A.

The embodiment shown in FIG. 2 incorporates a trolley 106 with an internal cavity extending throughout its length through which the cords 110/112 are placed. An alternative embodiment is shown in FIGS. 3A-3B in which the cords 110/112 are slidably connected to the trolley 106 by cord guides 116/117/118. The operation of the embodiment shown in FIGS. 3A-3B is otherwise identical to the exemplary embodiment shown in FIG. 2. In each of the embodiments shown in FIG. 2 and FIGS. 3A-3B, the friction between the cords 110/112 and either the trolley bar 106 or the cord guides 116/117/118 is sufficient to hold the trolley bar 106 in place until the caregiver desires to adjust the position of the shoulder straps 32.

The embodiment shown in FIGS. 3A-3B may include a trolley carriage 105. The trolley carriage 105 provides a housing for several components including the trolley 106 and cord guides 116/117/118 as well as providing a greater surface area for the trolley carriage 105 to contact and frictionally engage the child restraint seat 10. Cord guides 116 are provided to change the direction of the cords 110/112 from generally vertical to generally horizontal within the trolley carriage 105. Cord guides 117 maintain proper alignment of cords 110/112 with the cord guides 116. Cord guide 118 is provided proximate to the center of the trolley carriage 105 to ensure separation between cord 110 and cord 112. Trolley 106 may be comprised of two segments held on the trolley carriage 105 by trolley retainer 107 to facilitate easier assembly.

In an embodiment, channels 23 surround slots 22 on the rear surface 20. Channels 23 are thicker at their upper and lower ends, corresponding to the curvature of the rear surface 20, such that their edges are substantially coplanar. Thus the trolley carriage 105 is movable up and down in a generally linear range of motion. The trolley carriage 105 is movable within frame 119 on the rear surface 20. Frame 119 may be integrally molded into the rear surface 20 or may be an attached piece. Cord endpoints 114 may be mounted on frame 119. It is within the scope of the invention to include either or both of the channels 23 and the frames 119 in an embodiment of the invention as depicted in FIG. 2.

As shown in FIG. 2 and FIGS. 3A-3B, a single length of cord may be used to comprise both cords 110/112. This may be accomplished by running the continuous length of cord between either the upper endpoints 114 or, as shown in FIG. 2 and FIGS. 3A-3B, the lower endpoints 114. It is also within the scope of the invention to attach the free ends of cords 110/112 using a single boss secured by a fastener such as a screw.

A caregiver can raise and lower strap mounts 102 to change the height and lateral spacing of the shoulder straps 32 to fit the child who is to be restrained in the seat 10. To do so, the caregiver simply grasps the strap mounts 102 and exerts an upward or downward force sufficient to overcome the frictional forces holding the trolley 106 in place. When the desired position is reached, the caregiver releases the strap mounts 102.

Figure 4:
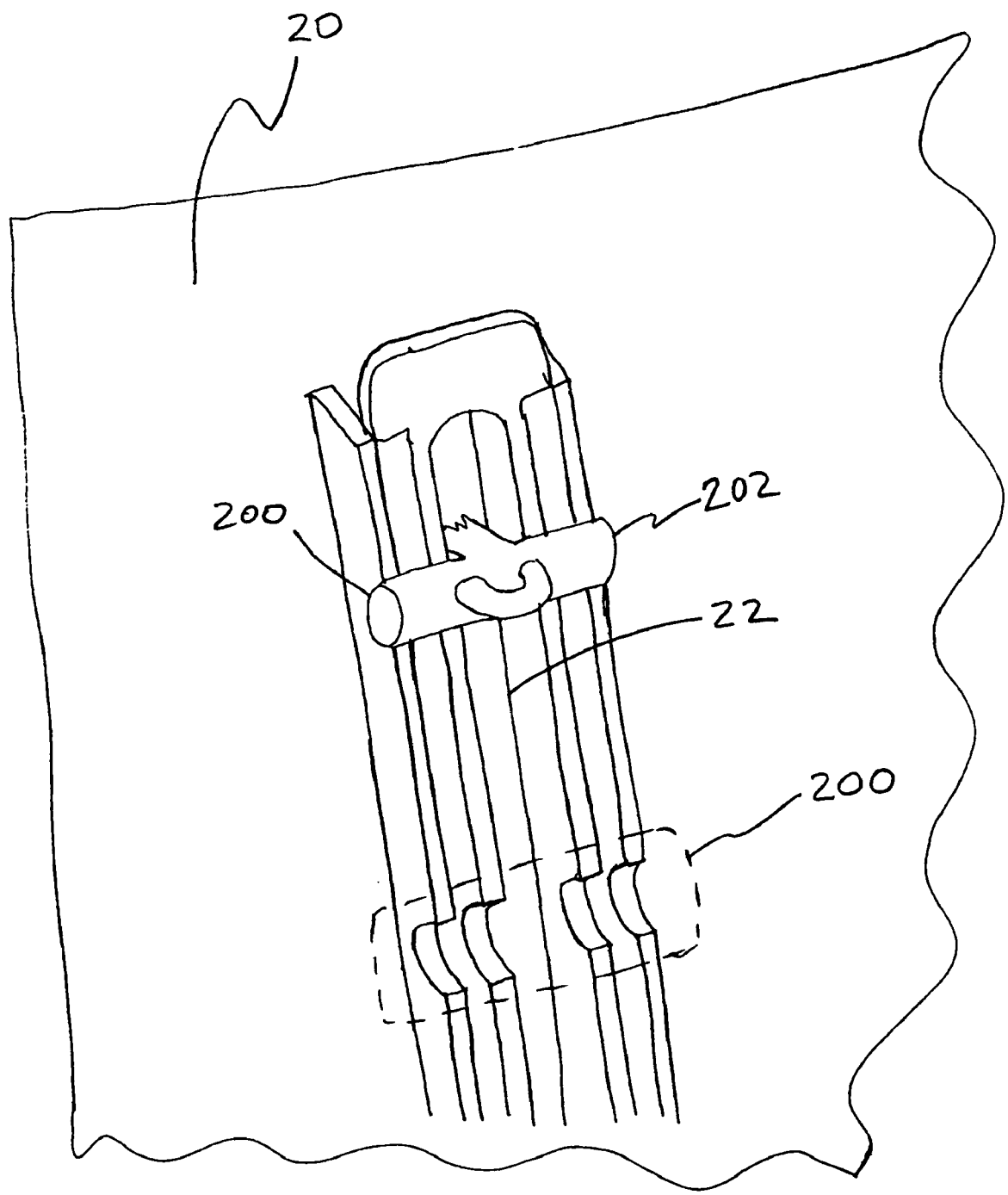
FIG. 4 is a detail perspective view of an embodiment of a shoulder strap mount and detent assembly for use in connection with the child restraint vehicle seat of FIG. 1.

In another embodiment of the present invention, shoulder strap 32 is connected to a shoulder strap mount 202. As shown in FIG. 4, shoulder strap mount 202 extends through slot 22 and releasably couples with a shoulder strap mount detent assembly 200. Each detent assembly 200 may be located on the rear surface 20 of the back support portion 16 of the seat shell 12 adjacent to slot 22. Alternately, the detent assembly 200 may be formed as part of a separate member which is affixed to the rear surface 20 of the back support portion 16 adjacent to slot 22.

Figure 5:
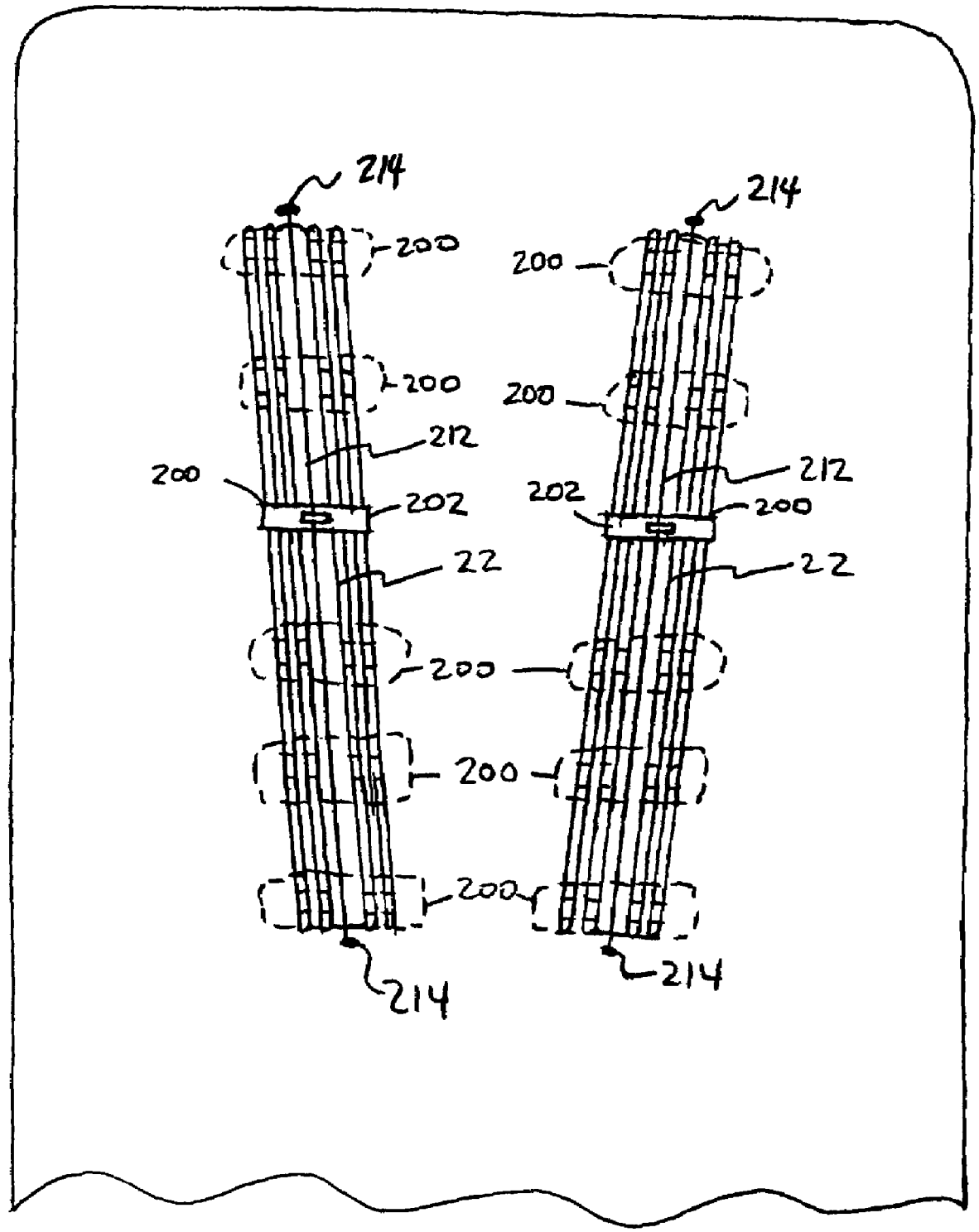
FIG. 5 is a rear elevation view of an alternate embodiment of the child restraint of FIG. 1.

As shown in FIG. 5, a plurality of detent assemblies 200 are associated with each slot 22. Each shoulder strap mount 202 is facilitated to be held in a detent assembly 200 by a retainer, such retainer can comprise an elastic cord 212. Each shoulder strap mount 202 is slidably attached to its associated elastic cord 212 at the hole formed by the generally toroidal protuberance 204 as shown in FIG. 6 and FIG. 7.

As shown in FIG. 5, cords 212 are affixed to the rear surface 20 of the back support portion 16 of the seat shell 12 both above and below slots 22 at points 214. Sufficient tension is present in the cords 212 to maintain the shoulder strap mounts 202 coupled with the detent assembly 200 until the caregiver desires to adjust the position of the shoulder strap mounts 202 as described below.

Figure 6:
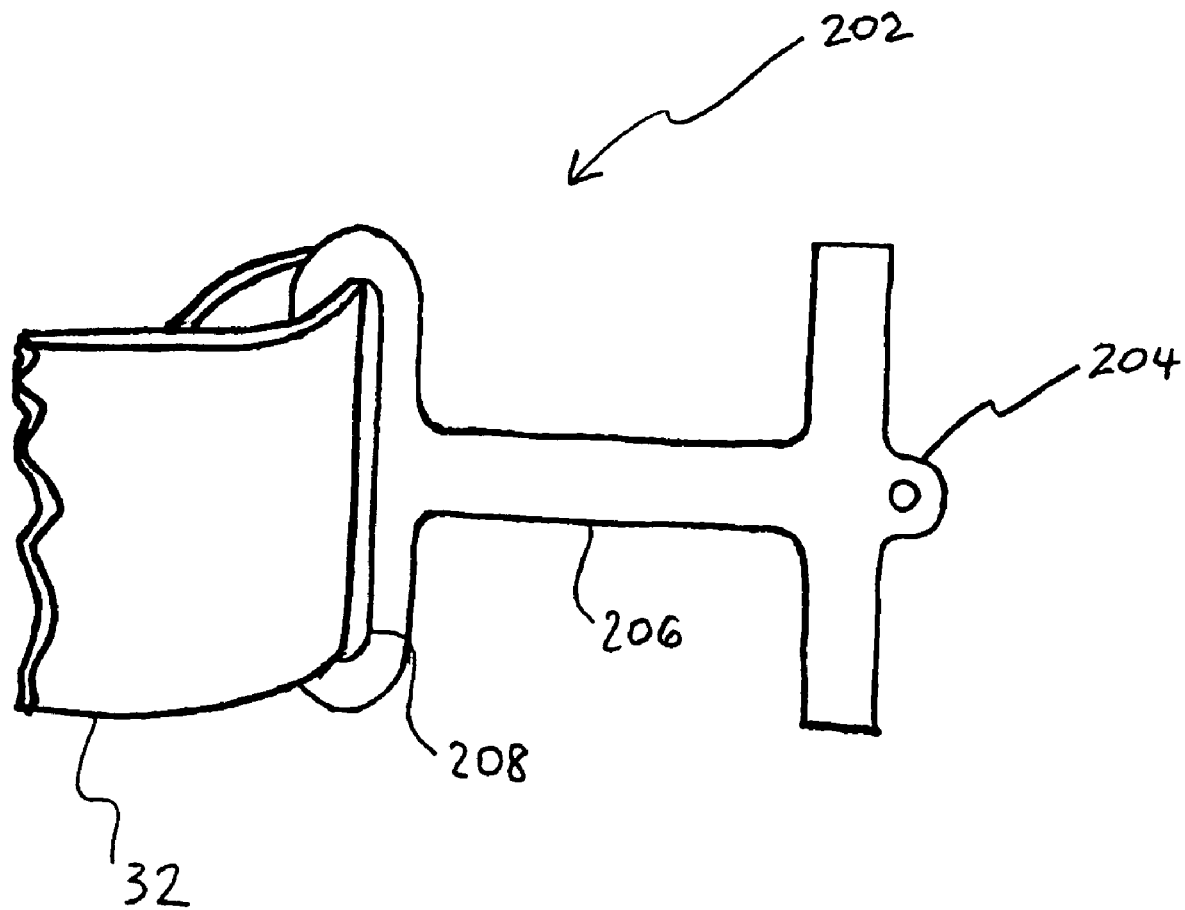
FIG. 6 is a perspective view of the shoulder strap mount of FIG. 4.
Figure 7:
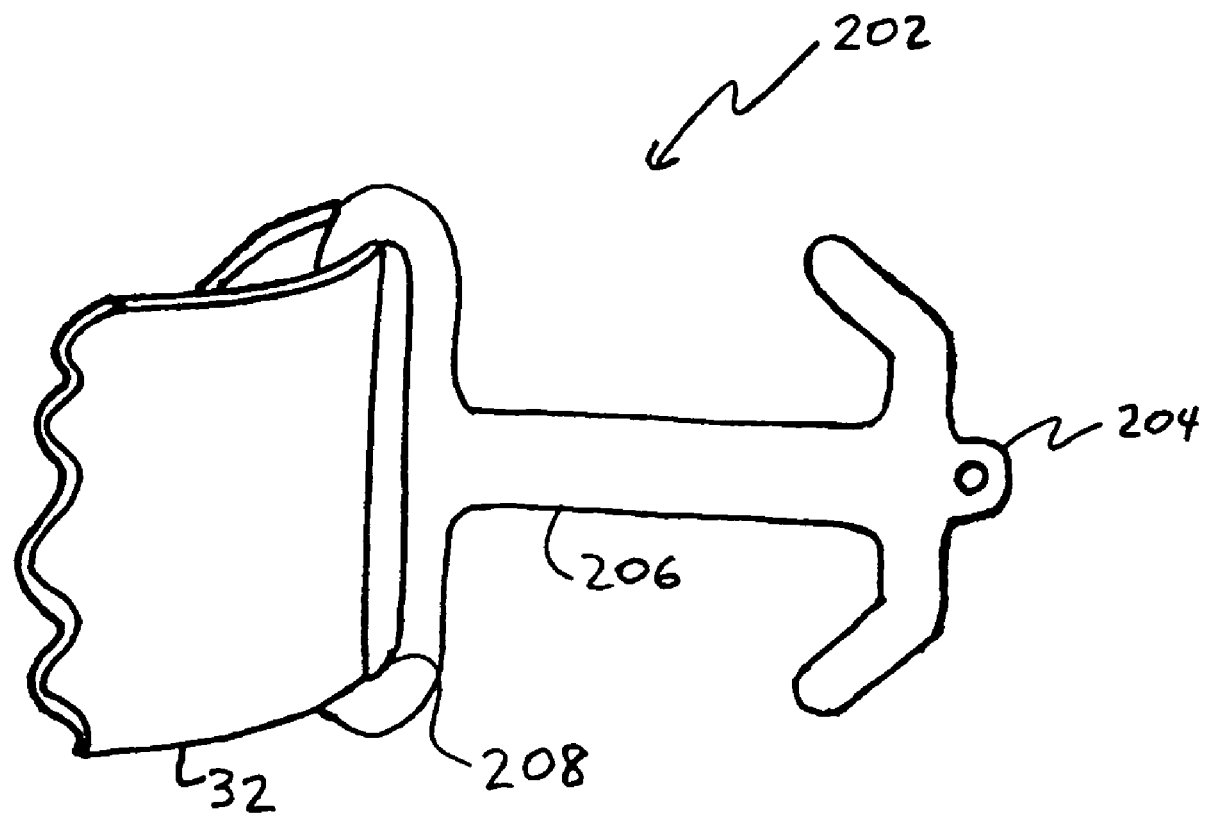
FIG. 7 is a perspective view of an alternate embodiment of the shoulder strap mount of FIG. 6.

In one exemplary embodiment, each shoulder strap mount 202 is generally H-shaped, as shown in FIG. 6. The shoulder strap 32 passes through one side of the H which defines a slot 208. The opposite vertical portion of the H is adapted to releasably couple with a shoulder strap mount height locator 200. This portion of the shoulder strap mount also includes a protuberance 204 of a generally toroidal shape through which cord 212 is run. The horizontal portion 206 of the H is adapted to slide easily within slot 22 in the seat shell 12.

To adjust the height of shoulder strap mount 202, the caregiver grasps the strap attachment portion of the mount 202 and pushes it generally horizontally towards the rear of the seat shell 12, overcoming the elastic tension on the cord 212, thus disengaging the shoulder strap mount 202 from the detent assembly 200. The caregiver then slides the shoulder strap mount 202 generally vertically within the slot 22 to the desired detent assembly 200 while maintaining the horizontal force. With the shoulder strap mount 202 adjacent to the desired detent assembly 200, the caregiver removes the rearward force on the shoulder strap mount 202 and the tension in the cord 212 causes the shoulder strap mount 202 to releasably couple with the detent assembly 200. The process is repeated for the other shoulder strap 32 and mount 202. Normally the shoulder strap mounts 202 are placed in corresponding detent assembly 200 such that they are at substantially the same height above the bottom seat portion 14.

An alternate embodiment of the shoulder strap mount 202 is shown in FIG. 7. In this embodiment, the portion of the shoulder strap mount 202 that couples with the detent assembly 200 includes curved ends. The associated detent assembly 200 is adapted to releasably engage the curved ends. It is within the scope of the present invention to utilize other alternative shapes of shoulder strap mounts and detent assembly.

It is within the scope of the present invention to substitute for elastic cords 212 substantially non-elastic cords coupled with one or more tensioning devices which, permit strap mounts 202 to be moved from one detent assembly 200 to another detent assembly 200 in the manner described above.

Additionally, it is within the scope of the present invention that a strap, cable, webbing, rope, or other elongate flexible member can be substituted for the elastic cords 212.

It is also within the scope of the present invention to utilize shoulder strap mounts 202 that include one or more recessed portions which are adapted to releasably couple with corresponding protuberances which comprise the detent assemblies 200 on the rear surface 20 of the back support portion 16 of the seat shell 12.

Following from the above description and invention summaries it should be apparent to those of ordinary skill in the art that, while the systems and processes herein described constitute exemplary embodiments of the present invention, it is understood that the invention is not limited to these precise systems and processes and that changes may be made therein without departing from the scope of the invention as defined by the following claims. Additionally, it is to be understood that the invention is defined by the claims and it is not intended that any limitations or elements describing the exemplary embodiments set forth herein are to be incorporated into the meanings of the claims unless such limitations or elements are explicitly listed in the claims. Likewise, it is to be understood that it is not necessary to meet any or all of the identified advantages or objects of the invention disclosed herein in order to fall within the scope of any claim, as the invention is defined by the claims and because inherent and/or unforeseen advantages of the present invention may exist even though they may not have been explicitly discussed herein.

What is claimed is:

1. A child restraint seat comprising:
   a seat shell having a seat portion and a back portion, the back portion having a front surface, a rear surface, and at least one slot therethrough having an upper end and a lower end;
   a harness including at least one shoulder strap for retaining a child in said seat shell;
   a harness adjuster comprising at least one strap mount shaped to receive said shoulder strap and shaped to be slidably received in said slot, said strap mount being attached to a trolley, where the trolley is movable in a generally vertical manner as the attached harness adjuster slides in the slot;
   at least one cord operably connected to said trolley for frictionally supporting said trolley against said rear surface of said back portion such that vertical movement of said trolley is prevented in the absence of an outside force from a caregiver to adjust said harness adjuster.

2. The child restraint seat of claim 1 wherein said at least one cord comprises two cords threaded through said trolley in an H configuration such that said trolley is frictionally held in place against said mar surface of said back portion.

3. The child restraint seat of claim 2 wherein said cords are attached to said rear surface of said back portion in a spaced apart configuration.

4. The child restraint seat of claim 2 wherein said at least one slot comprises two slots.

5. The child restraint seat of claim 4 wherein said cords are fixed to said rear surface of said back portion above said upper ends of said slots and below said lower ends of said slots.

6. The child restraint seat of claim 2 wherein said cords pass through an internal portion of said trolley.

7. The child restraint seat of claim 2 wherein said cords are coupled to an exterior surface of said trolley.

8. The child restraint seat of claim 7, wherein said trolley resides within a trolley carriage; and wherein said cords pass through at least a portion of said trolley carriage.

9. The child restraint seat of claim 8, wherein said cords are connected to said exterior surface of said trolley by at least one cord guide coupled to said trolley carriage, said trolley carriage being coupled to said trolley.

10. The child restraint seat of claim 1 wherein said cord is connected to an outer surface of the trolley.

11. The child restraint seat of claim 10, wherein said trolley resides within a trolley carriage: and wherein said cord passes through at least a portion of said trolley carriage.

12. The child restraint seat of claim 11, wherein said cord is connected to said outer surface of said trolley by at least one cord guide coupled to said trolley carriage, said trolley carriage being coupled to said trolley.

* * * * *